United States Patent [19]

Fink et al.

[11] Patent Number: 4,824,983
[45] Date of Patent: Apr. 25, 1989

[54] NEW FLUORINE-CONTAINING SILOXANES, THEIR SYNTHESIS AND USE AS DEFOAMING AGENT

[75] Inventors: Hans-Ferdi Fink; Götz Koerner, both of Essen; Roland Berger, Bochum; Christian Weitemeyer, Essen, all of Fed. Rep. of Germany

[73] Assignee: Th. Goldschmidt AG, Essen, Fed. Rep. of Germany

[21] Appl. No.: 106,561

[22] Filed: Oct. 6, 1987

[30] Foreign Application Priority Data

Oct. 15, 1986 [DE] Fed. Rep. of Germany ....... 3635093

[51] Int. Cl.$^4$ .............................. C07F 7/08; C07F 7/18
[52] U.S. Cl. ..................... 556/454; 556/455; 556/456; 556/457; 252/364; 252/351; 252/49.6; 208/15; 208/19
[58] Field of Search ............... 556/454, 455, 456, 457; 208/15, 19; 252/364, 49.6, 351

[56] References Cited

U.S. PATENT DOCUMENTS

| | | | |
|---|---|---|---|
| 2,993,925 | 7/1961 | Husted | 556/457 X |
| 3,148,201 | 9/1964 | Fassnacht | 556/454 |
| 3,196,251 | 8/1964 | Brown et al. | 556/454 X |
| 3,344,160 | 9/1967 | Holbrook | 556/457 X |
| 4,489,201 | 12/1984 | von Au et al. | 556/454 X |
| 4,574,149 | 3/1986 | Lee et al. | 556/454 X |
| 4,642,356 | 2/1987 | Langner et al. | 556/456 X |

OTHER PUBLICATIONS

"J. of Organometall. Chem.", 157, (1978), pp. 153 to 162.

Primary Examiner—Paul F. Shaver
Attorney, Agent, or Firm—Toren, McGeady & Associates

[57] ABSTRACT

Polysiloxanes of the general formula

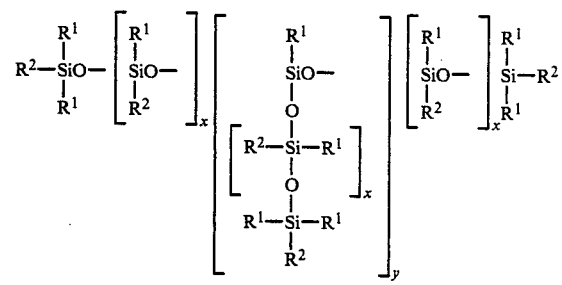

wherein $R^1$ is the same or different and represents alkyl or phenyl, $R^2$ is the same as $R^1$ or represents the $C_nF_{2n+1}(CH_2)_2O-$, in which n is a whole number from 4 to 16, with the proviso that no more than 90% of $R^2$ has the meaning of $R^1$, and $x = 5$ to 100 and
$y = 0$ to 10.

The polysiloxanes are effective defoamers of preparations containing organic solvents or of crude oil and may be synthesized from preferably equilibrated hydrogensiloxanes by reaction with $C_nF_{2n+1}(CH_2)_2OH$.

17 Claims, No Drawings

NEW FLUORINE-CONTAINING SILOXANES, THEIR SYNTHESIS AND USE AS DEFOAMING AGENT

FIELD OF INVENTION

The invention is directed to organopolysiloxanes with 2-perfluoroalkylethoxy groups and a method for the synthesis of these compounds. Considered from another aspect, the invention is concerned with the use of these compounds for defoaming organic solvent containing preparations of crude oil.

BACKGROUND INFORMATION AND PRIOR ART

To synthesize siloxanes with fluorinated hydrocarbon groups, the preferred startng materials according to the state of the art are silanes, which carry these fluorinated hydrocarbon groups. The reason for this is that the addition reaction of fluoroalkyl olefins to the SiH groups of silanes is facilitated by the presence of halogen atoms, which are linked to the same silicon atom. However, the synthesis of siloxanes of the previously given structure from silanes with fluorinated hydrocarbon groups also creates difficulties, since the hydrolysis and condensation of these silanes preferentially results in the formation of cyclic siloxanes.

It is furthermore known that fluorinated hydrocarbons with olefinic double bonds may be added to the SiH group of hydrogensiloxanes. In general, this addition reaction is hindered appreciably by other hydrocarbon or siloxy substituents on the silicon atom.

Fluoroalkylsilanes or siloxanes are disclosed in the German Offenlegungsschrift No. 3,423,608. These organosilicon compounds carry norbornyl groups having fluoro or fluoroalkyl groups. These compounds are synthesized by the addition reaction of the corresponding 2-norbornene derivative to hydrogensiloxanes in the presence of platinum catalysts. This addition reaction proceeds smoothly and in a satisfactory yield. However, because of the required fluorinated norbornyl derivative and the need to use a platinum catalyst, these compounds are relativey expensive.

There continues to be a need to synthesize polysiloxane with perfluorinated alkyl groups in as simple and therefore as inexpensive a manner as possible. To this end, especially those methods come into consideration, by means of which the appropriate fluorine-containing groups can be incorporated into the completely formed backbone of the polysiloxane. This has the advantage that it is possible to start with equilibrated organopolysiloxanes and to introduce the fluoroalkyl-containing substituents only at the end of the synthesis. At the same time, the new fluoroalkyl containing groups polysiloxanes shall have the defoaming properties of this class of compounds and be as effective as possible. Especially those compounds are of interest, which make it possible to defoam preparations which contain organic solvents, such as paints or lacquers. Furthermore, products are desired, which are able to defoam crude oil. Such defoaming problems arise, for example, when crude oil is extracted from a deposit under a high pressure and low-boiling hydrocarbons escape from the crude oil after the extraction, when the pressure is released.

OBJECTS OF THE INVENTION

It is accordingly the primary object of the invention to provide novel, fluoroalkyl group containing organopolysiloxanes which can be prepared in a simple and economical manner and which exhibit superior defoaming and foam preventing properties in respect to crude oil and organic solvents.

It is also an object of the invention to provide a simple and inexpensive method for synthesizing the novel polysiloxanes.

Generally, it is an object of the invention to improve on the art of fluoroalkyl group containing polysiloxanes and defoaming.

SUMMARY OF THE INVENTION

Surprisingly, it has now been ascertained that the above objects are fully met by novel organopolysiloxanes of the general formula

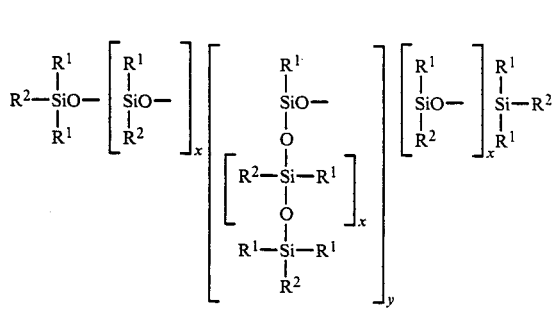

wherein
  $R^1$ is the same or different and represents alkyl or phenyl,
  $R^2$ is the same as $R^1$ or represents the $C_nF_{2n+1}(CH_2)_2O—$ group, in which n is a whole number from 4 to 16,
  with the proviso that no more than 90% of $R^2$ has the meaning of $R^1$,
and
  x=5 to 100 and
  y=0 to 10.

$R^1$ is preferably alkyl; particularly preferred is methyl. However, $R^1$ may also be an alkyl group with a larger number of carbon atoms, for example, an alkyl grup with up to 20 carbon atoms. In this case, however, not all the $R^1$ groups should have a long alkyl chain. Rather, the majority of $R^1$ should be lower molecular weight alkyl groups, especially methyl groups, with only up to 10% of $R^1$ being longer-chain alkyl groups. The solubility properties of the siloxanes with respect to organic solvents are affected by the content of such longer-chain alkyl groups. $R^1$ may also represent phenyl; preferably, however, not more than 20% of the $R^1$ groups are phenyl.

Not more than 90% of the $R^2$ groups have the same meaning as $R^1$. At least 10% of $R^2$ are groups derived from 2-perfluoroalkylethanol, with 4 to 16 carbon atoms in the perfluoroalkyl group, which are each linked through the oxygen atom to one silicon atom of the polysiloxane backbone. $C_nF_{2n+1}(CH_2)_2O—$ groups are preferred, in which n is a whole number from 4 to 12. These perfluoroalkylethanols are commercially available products.

The subscript x determines the number of difunctional siloxy units, the total number of which is 5 to 100. The subscript y refers to the number of optionally contained trifunctional siloxy units. There may be 0 to 10 trifunctional siloxy units in the average molecule. The compounds preferably are linear, in which case the number of y units is 0. Linear compounds of the general Formula I preferably contain 20 to 60 difunctional siloxy units. The compounds of the general Formula I are liquid to highly viscous compounds, which may be dissolved or dispersed in organic solvents or in crude oil. Surprisingly, it has been ascertained that the inventive organopolysiloxanes of Formula I, in spite of the SiOC bond between the perfluoroalkylethanol and the polysiloxane backbone, are practically hydrolysis resistant and are not split by the action of dilute mineral acids, even after several hours.

The difunctional siloxy units and the optionally contained trifunctional siloxy units are randomly distributed in the average molecule. This is due to the fact that, as shown below, the compounds are synthesized from preferably equilibrated hydrogenorganopolysiloxanes. Due to the equilibration, there is a uniform distribution of the functional units in the average molecule. This distribution follows the laws of statistics. It is clear to those skilled in the art that general Formula I is the formula which is assigned to the equilibrated organopolysiloxane mixture as an average formula. Instead of equilibrated starting compounds, it is however also possible to use those polysiloxanes in which a blockwise disposition of the difunctional units is present.

Examples of compounds of the invention are

A further aspect of the invention is a method of synthesizing the compounds of Formula I in an exceedingly simple manner. Pursuant to this method, compounds of the general formula

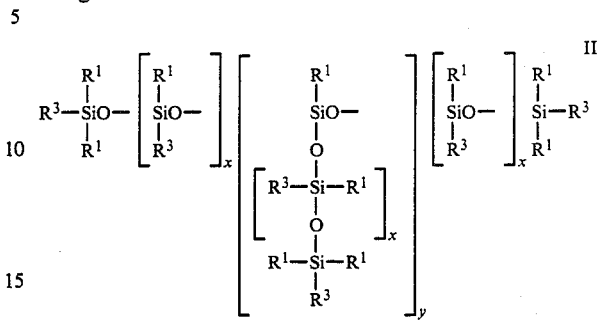

in which $R^3$ is the same as $R^1$ or a hydrogen atom with the proviso that not more than 90% of $R^3$ have the same meaning as $R^1$, and x and y have the given meaning, are reacted, based on the SiH groups, with at least equivalent amounts of alcohols of the general formula $C_nF_{2n+1}(CH_2)_2OH$ in the presence of catalysts, known per se for the alcoholysis, at elevated temperatures, hydrogen being split off.

The reaction of hydrogensiloxanes of Formula II with alcohols of the general formula

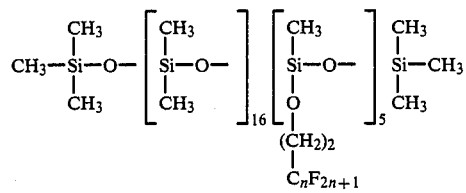

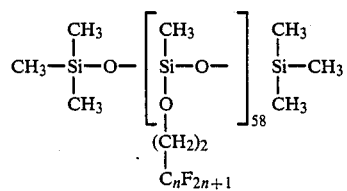

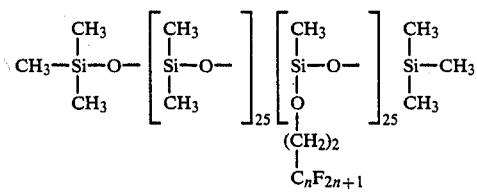

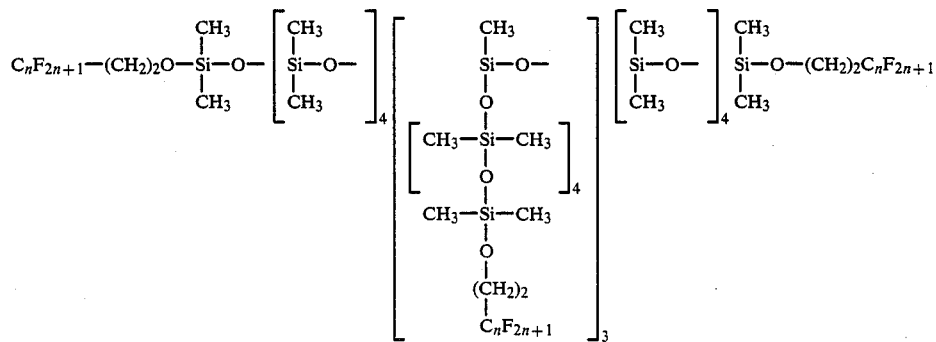

$C_nF_{2n+1}(CH_2)_2OH$ is a known reaction, which takes place in the presence of catalysts, such as amines, metal halides or metal complexes and is described in the "Journal of Organometalic Chemistry" 157 (1978), 153 to 162 by the example of the alcoholysis of silanes containing SiH groups. Examples of suitable catalysts are potassium tartrate, potassium phthalate, potassium rhodanide, potassium formate and potassium fluoride. The reaction generally is carried out at temperatures above 50° C., especially above 70° and more particularly at temperatures above 100°. Hydrogen is split off during the alkoxylation reaction. The addition of solvents is not absolutely necessary. In general, the hydrogenpolysiloxane is added to the reaction vessel first and heated to the reaction temperature. The catalyst is then added to the reaction vessel, followed by the perfluoroethanol. After the reaction, the catalyst can be removed from the product by filtration. The reaction time varies from a few minutes to several hours, depending on the reactivity of the hydrogensiloxane and the chain length of the perfluoroalkylethanol. In addition, the reaction rate is affected in known manner by the reaction temperature.

As shown by the examples, the compounds of Formula I are outstandingly suitable for defoaming preparations which contain organic solvents. They are especially suitable for defoaming lacquers. They moreover show a particularly good defoaming and antifoaming effect in organic solvent mixtures, which are used for for dry cleaning and contain so-called dry-cleaning detergents (surface active compounds) as well as surface active compounds, stripped from the material that has been cleaned. The compounds of the invention are added to these cleaning liquors during recovery by distillation and prevent foaming of the used solvent mixtures.

The inventive compounds are moreover suitable for defoaming, degassing freshly extracted crude oil and/or for preventing or reducing foam during the distillative recovery of the crude oil in the refinery.

In the following examples, the synthesis of the inventive polysiloxane is shown first. Subsequently, the defoaming properties of the new organopolysiloxanes of the invention are shown. The examples are given by way of illustration and not by way of limitation.

EXAMPLE 1

To a 500 mL 3-neck flask with stirrer, dropping funnel and gas discharge tube, are added 20.73 g (6.4 mmoles) of a siloxane of Formula II with $x=25$, $y=0$, $R^1=CH_3$ and 13.5% methyl groups in $R^3$, and 0.15 g of KF. The mixture is heated to 100°. Subsequently, 129.27 g (290 mmoles) of perfluorooctylethanol are added dropwise over a period of 1 hour at this temperature. The reaction that sets in is characterized by the formation of hydrogen. After a reaction period of 3 hours, the reaction product obtained is filtered. The yield is 143.3 g, which corresponds to 96% of the theoretical yield.

EXAMPLE 2

To a graduated and thermostated glass autoclave, which is equipped with a manometer, an outlet valve, a gas filling device, a safety valve and a thermometer, 30 mL of a degassed crude oil (so-called dead crude oil) are added and mixed with 40 mL of liquid propane gas (reactivated). After the temperature of the mixture, which is stirred with a magnetic stirrer, is adjusted, the pressure is reduced at a constant flow rate of the gas (15 L/min). The foam height is measured as a function of the degassing time. The area under the foam height-/time curve (foam index) is a measure of the foaming behavior of the crude oil and thus also of the effectiveness of the defoamer.

The defoaming action of the inventive compounds oil is checked using two "dead crude oils" from North Sea fields, which are particularly difficult to defoam. The results are summarized in Table 1 and compared with those of products of the state of the art.

TABLE 1

| | Foam Index | |
|---|---|---|
| | Dead Crude Oil 1 | Dead Crude Oil 2 |
| without defoamer | 55 | 42 |
| high molecular weight dimethylpolysiloxane of EP 0091257 (viscosity: 625,000 mPas) not of the invention | | |
| 1 ppm | 49 | 40 |
| 5 ppm | 35 | 33 |
| trifluoropropylmethylpolysiloxane (viscosity: 10,000 mPas) not of the invention | | |
| 1 ppm | 35 | 24 |
| 5 ppm | 35 | 23 |
| perfluoroalkylnorbornylmethylpolysiloxane of DE-OS 3,423,608 not of the invention | | |
| 1 ppm | 17 | 15 |
| 5 ppm | 4 | 6 |
| defoamer A (of the invention) | | |
| 1 ppm | 14 | 12 |
| 5 ppm | 4 | 5 |
| defoamer B (of the invention) | | |
| 1 ppm | 10 | 13 |
| 5 ppm | 3 | 4 |

Defoamer A:

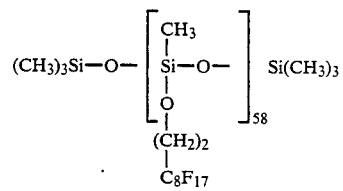

Defoamer B:

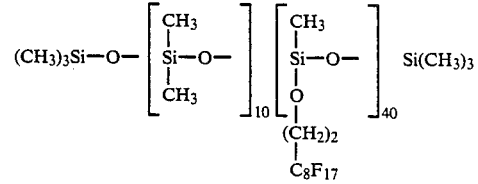

EXAMPLE 3

Into a test apparatus, which is defined in DIN 51381 and comprises a thermostated sample vessel and a capillary for passing in air, 180 mL of a conventional commercial, but defoamer-free hydraulic oil are filled and thermostated (T=25°). The test sample subsequently is gassed through the capillary (diameter=0.5 mm) at a pressure of 150 mm Hg for a period of 7 minutes. At the end of the aeration period, the capillary is removed and, on the one hand, the surface foam is evaluated and, on the other, the amount of air absorbed is determined by density measurement. The products checked are used at a concentration of 0.05% by weight. The results are summarized in Table 2.

TABLE 2

|  | Foam Height in mm | Air Content in % |
|---|---|---|
| without defoamer | 5 | 3.6 |
| $C_8F_{17}(CH_2)_2OH$ (not of the invention) | 5 | 3.3 |
| dimethylpolysiloxane (viscosity: 5,000 mPas) (not of the invention) | 2 | 3.5 |
| dimethylpolysiloxane (viscosity: 50,000) not of the invention | 3 | 2.9 |
| defoamer C (of the invention) | <1 | 1.4 |
| defoamer D (of the invention) | <1 | 1.3 |
| defoamer E (of the invention) | no surface foam | 1.0 |
| defoamer F (of the invention) | no surface foam | 1.0 |

Defoamer C:

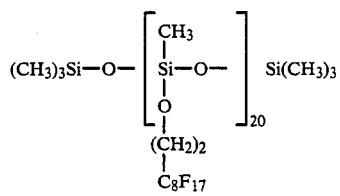

Defoamer D:

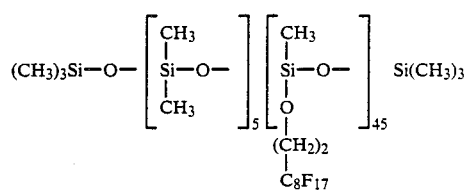

Defoamer E:

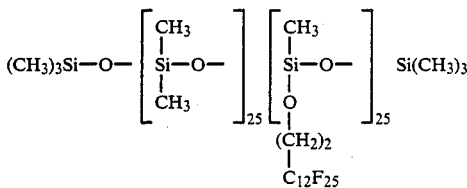

Defoamer F:

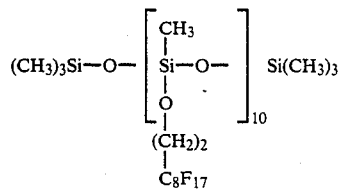

EXAMPLE 4

The compounds, listed in the following, are synthesized in the manner described in Example 1 and tested in accordance with the method described for their effectiveness as defoamers for the recovery of solvents, obtained after dry cleaning. The results obtained are compared with those obtained by one of the products on the market, which is preferred for this application.

Defoamer G:

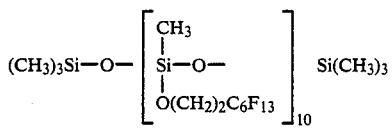

Defoamer H:

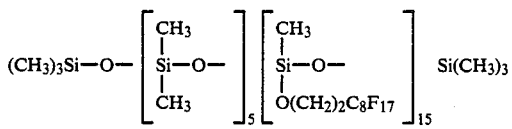

Defoamer J:

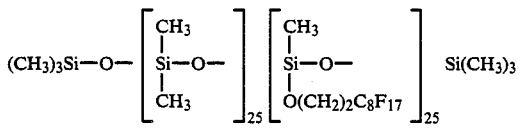

Defoamer K:

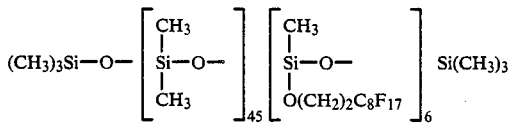

Defoamer L:

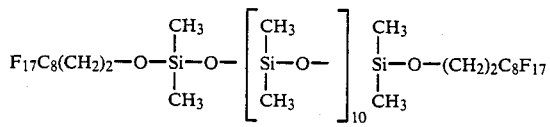

Defoamer M:

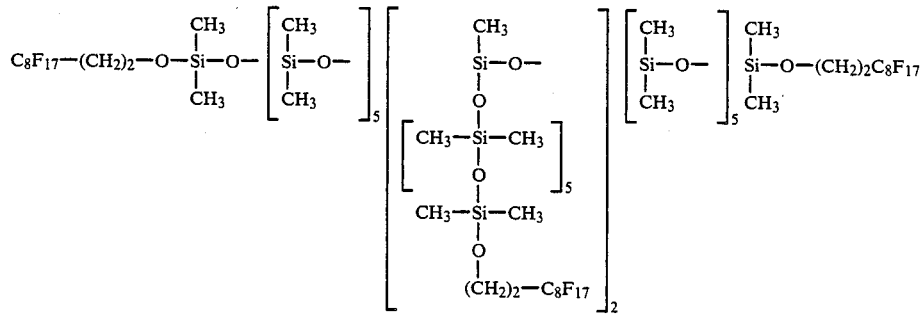

TESTING THE APPLICATION

The defoaming action of the inventive siloxanes is measured in accordance with the method described in the following.

To a well-cleaned 250 mL round-bottom flask with Anschütz attachment and a distillation bridge, the tapered joints of which are provided with Teflon sleeves, are added 100 mL of high purity trichloroethylene, 0.5 g of a dry-cleaning detergent (Vinoy 2000 of the Kreussler Company) and 0.1 g of silicone oil for impregnating purposes, 10 mL of distilled water and a few boiling stones, which have been defatted with solvents. Foam is formed reproducibly in the apparatus by heating rapidly to the boiling temperature. During the distillation of the trichloroethylene, the defoamer to be tested is metered in the form of a 0.1% solution in trichlorotrifluoroethylene by means of a suitable injection syringe into the foam zone of the boiling substance. The concentration of the active ingredient added and the foam collapse time are used to evaluate the effectiveness of the particular defoamer. Compounds corresponding to those of German Pat. No. 1,228,591, which represent trifluoropropylmethylpolysiloxanes, are used as comparison substances. Comparison product 1 has a viscosity of 10,000 mPas, comparison product 2 one of 1,000 mPas and comparison product 3 one of 350 mPas.

TABLE 3

| Product | Amount of Defoamer in ppm | Evaluation of Defoamer Behavior |
| --- | --- | --- |
| Defoamer C | 2 | spontaneous foam collapse |
| Defoamer G | 4 | spontaneous foam collapse |
| Defoamer H | 4 | spontaneous foam collapse |
| Defoamer J | 3 | spontaneous foam collapse |
| Defoamer K | 6 | collapse after 10 seconds |
| Defoamer L | 4 | collapse after 6 seconds |
| Defoamer M | 4 | collapse after 5 seconds |
| Comparison Product 1 | 8 | slow foam destruction at 8 ppm, foam collapse at 10 ppm and above |
| Comparison Product 2 | | incipient foam destruction |
| Comparison Product 3 | | incipient foam destruction |

EXAMPLE 5

The compounds described in Example 4 are checked in a conventional commercial chlorinated rubber lacquer in the following manner for their defoaming action.

The chlorinated rubber lacquer (200 g) is stirred for 1 minute in a beaker (with a diameter of 6 cm) with a turbine (having a diameter of 4 cm) at a rate of 2,500 r.p.m. Immediately afterwards, the sample, which now contains stirred-in air, is filled up to the mark into a 100 mL measuring flask and weighed. The weight depends on the entrained air and is thus a measure of the effectiveness of a defoamer. The amount of entrained air is calculated using the following formula:

$$\% \text{ air } (v/v) = 100 - \frac{\text{weight of 100 mL of stirred lacquer}}{\text{weight of 100 mL of air-free lacquer}}$$

TABLE 4

| Product | % Air (v/v) |
| --- | --- |
| Lacquer without defoamer | 39.25 |
| Lacquer with 0.01% defoamer C | 3.05 |
| Lacquer with 0.01% defoamer G | 4.16 |
| Lacquer with 0.01% defoamer H | 3.92 |
| Lacquer with 0.01% defoamer J | 3.97 |
| Lacquer with 0.01% defoamer K | 4.25 |
| Lacquer with 0.01% defoamer L | 3.26 |
| Lacquer with 0.01% comparison product 1 | 6.40 |
| Lacquer with 0.01% comparison product 2 | 7.14 |

The compounds are preferably added to the systems to be defoamed, such as preparations containing organic solvents or crude oil, in amounts of 0.0001 to 1% by weight, preferably 0.0001 to 0.1% by weight calculated on the system.

We claim:

1. A compound of the formula

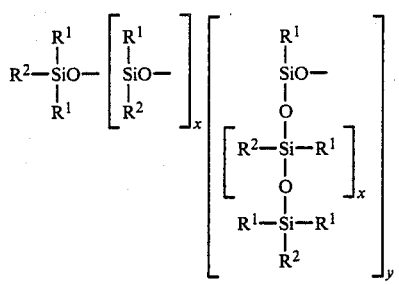

I wherein
R$^1$ is the same or different and represents alkyl or phenyl,
R$^2$ is the same as R$^1$ or represents the C$_n$F$_{2n+1}$(CH$_2$)$_2$O— group, in which n is a whole number from 4 to 16,
with the proviso that no more than 90% of R$^2$ has the meaning of R$^1$,
and
x=5 to 100 and
y=0 to 10.

2. The compound of claim 1, wherein the alkyl of R$^1$ is methyl.

3. The compound of claim 1, wherein the alkyl of R$^1$ comprises up to 10% of long-chain alkyl of up to 20 carbon atoms with the remainder being lower molecular weight alkyl.

4. The compound of claim 3, wherein the lower molecular weight alkyl is methyl.

5. The compound of claim 1, wherein up to 20% of R$^1$ is phenyl.

6. The compound of claim 1, wherein the C$_n$F$_{2n+1}$(CH$_2$)$_2$O groups are derived from 2-perfluoroalkylethanol and are linked to a silicon atom of the polysiloxane backbone through oxygen.

7. The compound of claim 6, wherein n=4 to 12.

8. The compound of claim 1, wherein the compound is linear with y=0.

9. The compound of claim 8, wherein the compound comprises 20 to 60 difunctional siloxy units.

10. The compound of claim 1, wherein the difunctional and any present trifunctional siloxy units are statistically distributed in the average molecule.

11. A method for the synthesis of a compound of claim 1, which comprises reacting a compound of the general formula

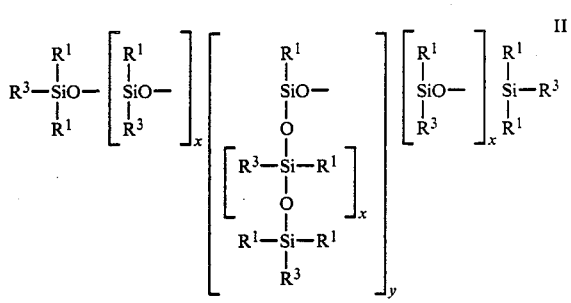

II wherein
R$^1$ is the same or different and represents alkyl or phenyl;
R$^3$ is the same as R$^1$ or a hydrogen atom with the proviso that at the most 90% of R$^3$ has the meaning of R$^1$;
x=5 to 100, and
y=0 to 10
with, based on the SiH groups of Formula II, at least equimolar amounts of an alcohol of the formula C$_n$F$_{2n+1}$(CH$_2$)$_2$OH in which n is a whole number from 4 to 16, said reaction being carried out at elevated temperature and in the presence of an alcoholysis promoting catalyst, whereby hydrogen is split off.

12. The method of claim 11, wherein the reaction is carried out at a temperature of about between 70°–100° C.

13. In a process of defoaming an organic solvent containing preparation, wherein a defoaming agent is added to the preparation to cause collapse or prevention of formation of foam, the improvement which comprises that the defoaming agent is an effective amount of a compound of claim 1.

14. The improvement of claim 13, wherein the preparation is a lacquer system.

15. The improvement of claim 13, wherein the preparation is a dry-cleaning liquor containing a mixture of organic solvents and surface active agents.

16. The improvement of claim 15, wherein the compound of claim 1 is added to the dry-cleaning liquor during its distillative recovery.

17. The improvement of claim 13, wherein the preparation comprises extracted crude oil.

* * * * *